United States Patent

[11] 3,537,462

[72] Inventor Peter V. Genna
 Brooklyn, New York
[21] Appl. No. 802,170
[22] Filed Feb. 25, 1969
[45] Patented Nov. 3, 1970
[73] Assignee Wally Frank, Ltd
 New York, New York
 a corporation of New York

[54] SMOKING PIPE BOWL SHANK AND STEM CONNECTION
 1 Claim, 4 Drawing Figs.
[52] U.S. Cl. ........................................................ 131/225
[51] Int. Cl. ....................................................... A24f 1/00,
 A24f 7/02
[50] Field of Search ........................................... 131/225

[56] References Cited
UNITED STATES PATENTS
| 1,168,481 | 1/1916 | Combs | 131/225 |
| 2,461,905 | 2/1949 | Lavietes | 131/225 |
| 3,044,472 | 7/1962 | Keyser | 131/225 |

FOREIGN PATENTS
| 274,743 | 7/1927 | Great Britain | 131/225 |

Primary Examiner—Joseph S. Reich
Attorney—Harry B. Rook

ABSTRACT: A coupler to separably connect the bowl shank and the stem of a smoking pipe, has one end threaded to screw into the shank bore. The other end portion is cylindrically smooth and the stem is frictionally longitudinally and rotatably slidable thereon. Between said end portions the coupler has a circumferential flange that is disposed wholly in a counterbore of said shank and firmly seats on the bottom wall of the counterbore.

Patented Nov. 3, 1970 3,537,462
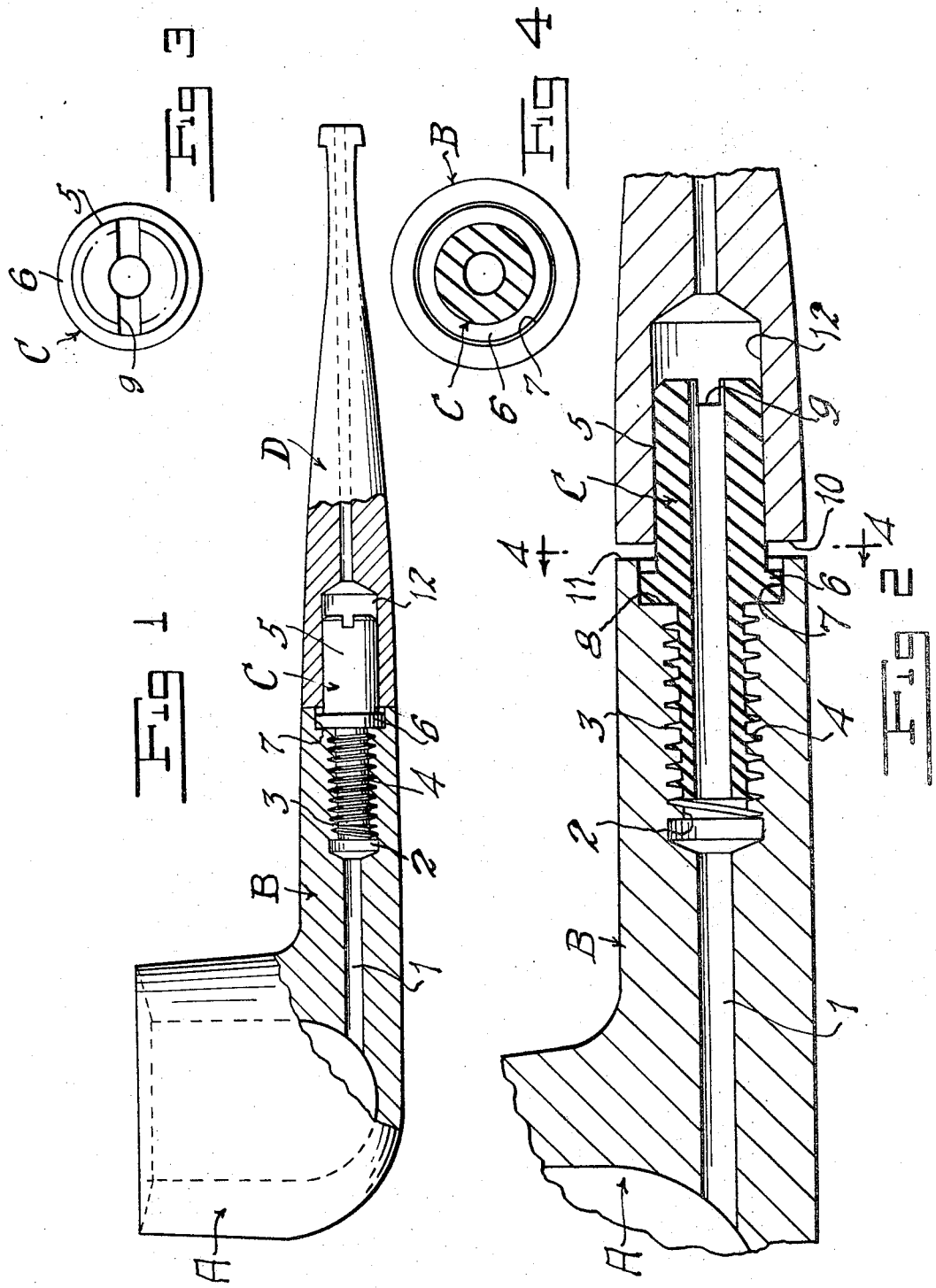

SMOKING PIPE BOWL SHANK AND STEM CONNECTION

BACKGROUND OF THE INVENTION

In one type of shank and stem connection, the stem has a cylindrical tenon at one end which is longitudinally slidable and rotatable in a bore in the shank.

Another type of shank and stem connection comprises a screw threaded tenon on the stem and a complementary screw-threaded bore in the shank.

The first-mentioned type of connection has the objection that it is difficult to obtain a tight nonseeping joint between this shank and the stem, and it is practically impossible to maintain a snug connection between the parts because of the wear incident to frequent removal and replacement of the stem.

The second-mentioned connection has the objection that due to wear of the screw threads looseness in the connection of the parts occurs and results in seepage of moisture through the connection. Also attempts to tighten the connection by screwing the stem more firmly into the shank results in a displacement of the bit or mouthpiece of the stem with respect to the bowl and sometimes causes a stripping or damaging of the threads in either or both of the shank and tenon.

SUMMARY

One object of the present invention is to provide a connection between a bowl shank and a stem which shall overcome the above-mentioned objections to the prior art.

More particularly the invention contemplates a construction and a combination of a bowl shank, stem and coupler wherein the coupler has one end screw threaded into the bore, and the stem is frictionally longitudinally and rotatably slidable on the other end portion of the coupling; and said coupler has a circumferential flange between said end portion that is disposed wholly in a counterbore of the shank and firmly seats on the bottom wall of the counterbore, whereby the stem can slide longitudinally and rotate on the coupler and the coupler can be tightly screwed into the shank bore without danger of stripping the threads and with practical insurance of a seepage-proof joint between the coupler and the shank.

A BRIEF DESCRIPTION OF THE DRAWINGS

For a complete understanding of the invention, reference should be had to the following description in conjunction with the accompanying drawings in which:

FIG. 1 is a central vertical longitudinal sectional view through portions of the bowl shank and stem and showing the coupler in side elevation;

FIG. 2 is an enlarged central, vertical longitudinal sectional view with portions of the bowl and the stem omitted;

FIG. 3 is an end view of the coupler; and

FIG. 4 is a similar view on the plane of the line 4-4 of FIG. 2.

BRIEF DESCRIPTION OF THE PREFERRED EMBODIMENTS OF THE INVENTION

The reference character A designates the smoking pipe bowl which has a shank B provided with a smoke duct 1 and a bore 2 to receive the coupler C which serves to separately connect the shank B to the stem D.

The shank bore 2 is entirely screw threaded at 3 to receive the threads 4 on one end portion of the coupler C the other end portion of which is smoothly cylindrical as indicated at 5 and on which is longitudinally slidable and rotatable the stem D. Preferably the coupler is formed of a moldable plastic material, for example hard rubber or Bakelite, and the stem is preferably formed of the same material. Between its said end portions, the coupler has a circumferential flange 6 which is adapted to be wholly disposed within a counterbore 7 at the end of the bore in the shank. The depth of the counterbore is greater than the thickness of the flange. When the screw-threaded end of the coupler is screwed into the bore of the shank, the flange 6 firmly or tightly abuts the bottom wall 8 of the counterbore. For convenience in screwing the coupler into the shank and unscrewing it from the shank, the coupler is provided with a diametrical kerf 9 in the stem-receiving end thereof.

However, in accordance with the invention the stem has a sufficiently tight frictional fit on the coupler so that the coupler can be screwed into and out of the shank bore by simple rotation of the stem. The stem has at one end a cylindrical smooth-walled socket 12 which receives the cylindrical end 5 of the coupler and the stem and is frictionally rotatable on the coupler so that the stem can be easily adjusted into the proper relation to the bowl, and the stem is also longitudinally slidable on the coupler so that the inner end 10 of the stem can be kept in neat and tight abutment with the end surface 11 of the shank. FIG. 2 shows the stem slid away from the end of the shank while FIG. 1 shows the stem and shank in their normal relation to each other.

It will be seen readily that the flange limits the screwing of the coupler into the shank and thus protects against stripping of the threads. At the same time, the flange abutting the bottom wall of the counterbore provides a seepage-proof joint between the coupler and the shank. To compensate for wear of the threads or of the abutting surfaces of the flange and the counterbore, the coupler can be screwed farther into the bore, and the stem can be slid on the coupler to maintain the neat and tight joint between the end 10 of the stem and the end 11 of the shank.

I claim:

1. A smoking pipe comprising a bowl having a shank which has an internally screw-threaded bore at the outer end of which is a counterbore, a stem having at one end a cylindrical smooth walled socket providing a bottom wall therein, and a coupler having a cylindrical smooth end portion frictionally received in said socket for relative longitudinal movement and rotation, said coupler having its other end portion screw-threaded to mate with said screw-threaded bore and having a flange between said end portions wholly disposed in said counterbore and in firm abutting contact with the bottom wall of said counterbore, the depth of the counterbore being greater than the thickness of the flange.